United States Patent Office 2,738,646
Patented Mar. 20, 1956

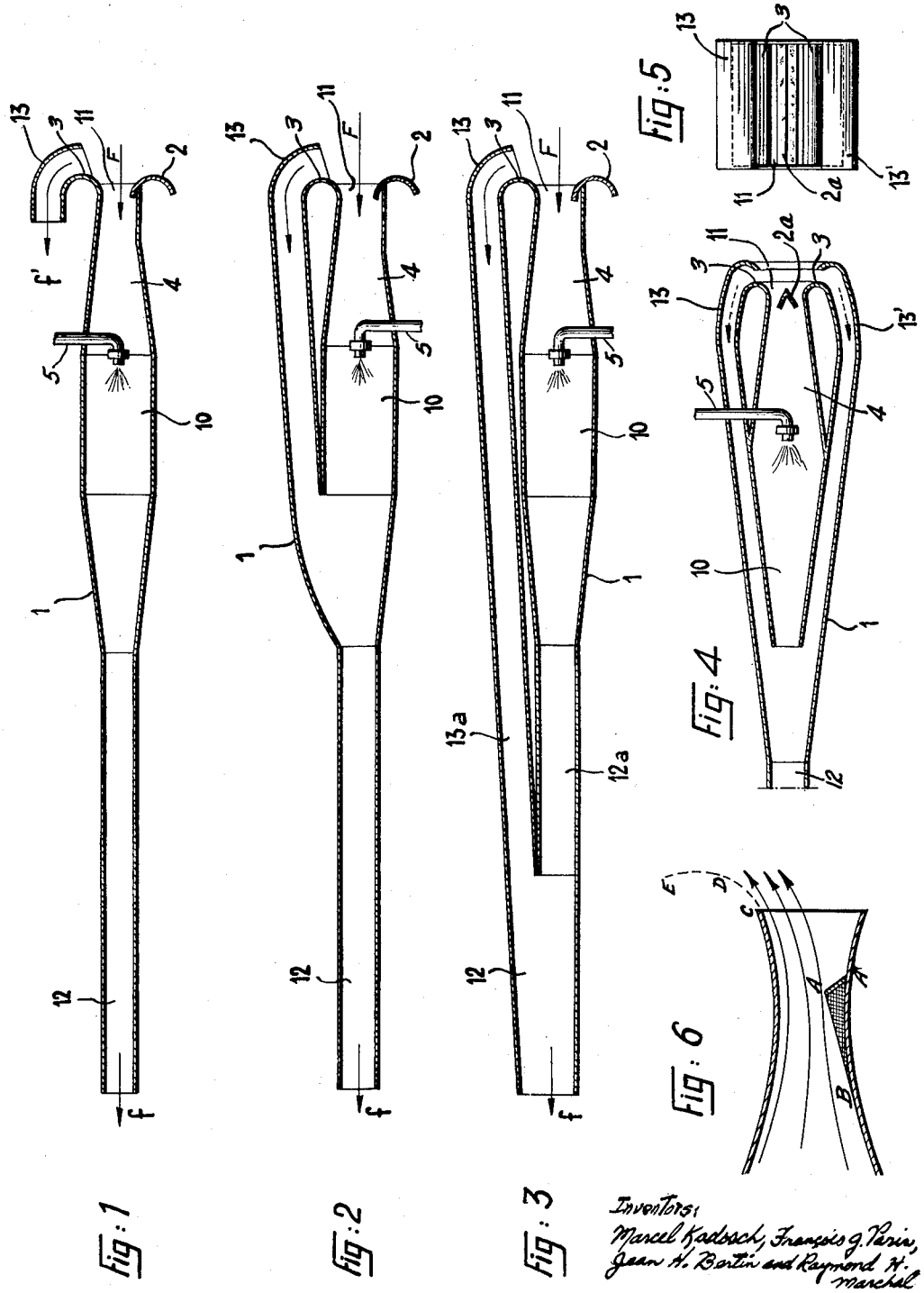

2,738,646

FLOW CONTROL MEANS FOR INTERMITTENT IMPULSE DUCTS

Marcel Kadosch, Paris, François G. Paris, Chaville, Jean H. Bertin, Neuilly-sur-Seine, and Raymond H. Marchal, Paris, France, assignors to Societe Nationale d'Etude et de Construction de Moteurs d'Aviation, Paris, France, a company of France Original application August 5, 1949, Serial No. 108,758, now Patent No. 2,702,986, dated March 1, 1955. Divided and this application January 24, 1952, Serial No. 268,016

Claims priority, application France August 11, 1948

10 Claims. (Cl. 60—35.6)

This application is a divisional application of our copending application Ser. No. 108,758 filed August 5, 1949, now Patent No. 2,702,986.

The present invention relates to flow control in pulse jet or intermittent impulse ducts.

Pulse jets, also known as "intermittent-duct engines" used for powering aircraft or flying missiles, consist of a simple duct or tube ending with a rearwardly directed jet nozzle and equipped at its front inlet, with a device for allowing unidirectional rearward flow, the median portion of this duct forming an explosion chamber operating at the resonance frequency of the duct. Fresh atmospheric air is supplied to the explosion chamber, between successive explosions, through the front inlet, owing to the depression obtaining in said chamber after each explosion and to the relative air draft due to the forward motion of the duct. The high-temperature gases generated after each explosion rush rearward through the jet nozzle, thus producing forward motion by reaction, since they are prevented from issuing from the front inlet owing to the unidirectional flow device.

Conventional intermittent-duct engines, such as in the V-1 buzz bomb, are provided, at their front inlet, with flap-like check valves. These valves have proved quite inconvenient owing, in particular, to the fact that they are movable members subject to considerable strain and very high temperatures.

In order to cope with this drawback, aerodynamically-operating stationary baffles have been proposed as a substitute for check valves. These baffles are so arranged as to allow free flow in the rearward direction, while hindering forward flow. However, in such arrangements, important leakages and pressure losses occur.

The present invention has for its object to provide an intermittent impulse duct in which the air inlet is permanently and completely open, thus allowing unrestricted flow in both directions, means being provided for rearwardly deflecting gases issuing from the front inlet.

A further object of this invention is to provide means for conveying the deflected gases to a rearwardly directed jet nozzle spaced from the nozzle of the duct.

A still further object of this invention is to provide means for feeding back the deflected gases to the duct in a zone thereof between the explosion chamber and the nozzle.

Other objects and advantages of the invention will be apparent during the course of the following description.

In the accompanying drawing in which like reference characters are employed to designate like parts throughout the same, Fig. 1 is a diagrammatic axial section of an intermittent impulse duct according to the invention.

Figs. 2, 3 and 4 are similar sections of other forms of the invention.

Fig. 5 is a front end view of the embodiment of Fig. 4.

Figure 6 is a diagrammatic axial section of a nozzle, illustrating the principle on which the invention is based.

The nozzle shown in Figure 6 has a converging-diverging shape and is provided in its neck zone, i. e. its narrowest portion, with an obstacle AA' formed by a solid member projecting from a wall of the nozzle (the lower wall in the drawing). This obstacle AA' forms a partition intercepting a part of the gaseous flow through the nozzle and gives rise to a zone AA'B in which fluid is substantially at rest, statistically speaking, i. e., this zone may be a zone of turbulence, but the mean velocity of the fluid molecules and in particular the component of this mean velocity parallel to the axis of the nozzle is substantially zero. In other words, with regard to the jet flowing through the nozzle at a relatively high velocity, the fluid in the zone AA'B may be considered as a stationary boundary layer forming a kind of fluid cushion between the lower side of the jet and the wall BA'.

This stationary boundary layer AA'B gives rise to a deflecting action due to the viscosity of the fluid, in accordance with a well-known phenomenon in hydraulics and aerodynamics which may be summarized as follows: the friction between the gaseous flow forming the jet and the stationary boundary layer AA'B is substantially less than the friction between this jet and the upper wall of the nozzle with which it is in direct contact, these two frictional forces acting tangentially on the jet in the same direction, but being of unequal magnitudes—the upper one being greater than the lower one—a counterclockwise deflecting moment is produced which urges the jet upwards, i. e. away from the obstacle carrying wall.

The deflection thus initiated by the obstacle AA' is furthered by a smooth convex wall CDE (shown in dotted line) forming an extension of the upper wall of the nozzle and merging into it at its outlet end C. The deflected jet is applied on this convex extension as a result of friction forces, for the same reasons as those specified in connection with the action of the obstacle AA': the friction exerted by the extension CDE on one side of the jet is substantially greater than that exerted on its opposite side by atmospheric air, thereby producing a counterclockwise deflecting moment which urges the jet further upwards.

Therefore, the jet—the deflection of which is initiated by the obstacle AA' tends to "stick" to the curved extension CDE; in other words, the fluid which flows through the nozzle is first urged by AA' towards CDE and then flows along the latter up to its end E (provided, of course, the radius of curvature of CDE is large enough; otherwise the flow will separate from the wall).

The object of the present invention is to provide the inlet end of intermittent impulse ducts with a deflecting device operating on the principle described above, through the cooperative action of an obstacle and a convex wall opposite said obstacle.

In the drawing, the numeral 1 generally indicates an intermittent impulse duct having in succession an air inlet passage 4 of diverging shape, a median portion 10 forming an explosion chamber into which fuel is supplied by means of a burner 5, and an outlet nozzle 12.

At the inlet 11, there is provided an obstacle 2 which projects into the passage 4, from the lower wall of the duct and which is inclined rearwardly with respect to this wall. This member 2 is smoothly curved on its outer surface facing frontwards and, therefore, has practically no effect on air flowing in along the direction of the arrow F, while deflecting fluid flowing out in the opposite direction, as explained above with reference to Figure 6 in connection with the action of the obstacle AA'. Thus fluid flowing through the duct portion 4 in the direction opposite to that of the arrow F, will be deflected upwards (in Figures 1, 2 and 3) towards a convex extension 3 of the upper wall of the duct and will "stick" to this extension which leads into a curved pipe 13.

In the embodiment of Fig. 1, the pipe 13 ends with a jet nozzle directed parallel to the nozzle 12, so that the gases issuing along arrow f' produce a reaction which adds up to the main reaction due to the gases issuing along the direction f.

The forms of ducts in Figs. 2 and 3 are only different from the previous one in so far as the pipe 13 leads back the deflected gases, either the rear of the explosion chamber 10, so that the whole amount of hot gases expands inside nozzle 12, or in the vicinity of the outlet of said nozzle, the expansion then occurring separately inside portions 12a and 13a of the ducts.

The intermittent impulse duct shown in Figs. 4 and 5 has a symmetrical shape, the combustion chamber 10 has a rectangular cross-section and the inlet 11 through which fresh air flows in, has the shape of a slot parallel to the length of the rectangular cross-section. To both sides of this slot, pipes 13 and 13' of rectangular cross-section are connected; they convey towards the rear of the explosion chamber, the gases deflected on both sides of slot 11. Deflection is caused by a deflector 2a of symmetrical shape constituted for instance by a metal sheet folded at an acute angle and extending along the major axis of slot 11.

What we claim is:

1. The combination with an intermittent impulse duct having a permanently opened frontal inlet passage designed for the downstream flow of air but through which there is produced an upstream flow of combustion gases, of a device for turning over said gases towards a generally downstream direction comprising flow guiding means including a convex wall extending outwardly at least a part of the periphery of said passage, and means in the vicinity of but spaced from said part of the periphery for laterally deflecting said upstream flow towards said flow guiding means and in contact with said convex wall.

2. The combination of claim 1, wherein the means for laterally deflecting said upstream flow includes a solid obstacle projecting into said inlet passage.

3. A pulse jet unit including duct-like structure having a permanently opened frontal air inlet passage, a rearwardly directed reaction nozzle and a combustion chamber therebetween, means for injecting fuel into said combustion chamber, flow intercepting means for laterally deflecting gas flowing upstream through said inlet passage, towards at least a part of the periphery thereof, and flow guiding means for turning over said laterally deflected flow towards a generally downstream direction, said flow guiding means including a convex wall extending outwardly said part of the periphery and adapted to convey therealong gas flowing in contact therewith.

4. Pulse jet unit according to claim 3, wherein said convex wall forms a curved extension smoothly merging with said part of the periphery of the inlet passage.

5. Pulse jet unit according to claim 4, wherein the curved convex wall extends through an arc of the order of 180° to achieve corresponding turn over of the gas flowing upstream through the inlet passage.

6. Pulse jet unit according to claim 3, wherein said flow guiding means opens into atmosphere in a direction generally parallel to the axis of said reaction nozzle.

7. Pulse jet unit according to claim 3, wherein said flow guiding means includes a further wall opposite and generally parallel to said convex wall, and bounding therewith a rearwardly bent duct having an end opening into said inlet passage.

8. Pulse jet unit according to claim 7, wherein said rearwardly bent duct opens into atmosphere in a direction generally parallel to the axis of said reaction nozzle.

9. Pulse jet unit according to claim 7, wherein said rearwardly bent duct is connected to a zone of said pulse jet unit downstream of said combustion chamber.

10. Pulse jet unit according to claim 3, wherein said air inlet passage has an axis of symmetry, the flow intercepting means and the flow guiding means being symmetrically arranged about said axis.

References Cited in the file of this patent

UNITED STATES PATENTS

| | | |
|---|---|---|
| 1,801,007 | Jezler | Apr. 14, 1931 |
| 2,523,308 | Kemmer | Sept. 26, 1950 |
| 2,573,697 | Dunbar | Nov. 6, 1951 |
| 2,574,460 | Bohanon | Nov. 13, 1951 |
| 2,639,580 | Stuart | May 26, 1953 |